United States Patent [19]
Bass et al.

[11] Patent Number: 5,692,353
[45] Date of Patent: Dec. 2, 1997

[54] LUMBER-COMPATIBLE LIGHTWEIGHT METAL CONSTRUCTION SYSTEM

[76] Inventors: Kenneth R. Bass, deceased, late of El Cajon, Calif.; by Donna Bass, executor, 1728 Eldon Ct., El Cajon, Calif. 92021

[21] Appl. No.: 413,544

[22] Filed: Mar. 30, 1995

Related U.S. Application Data

[63] Continuation-in-part of Ser. No. 190,643, Feb. 2, 1994, Pat. No. 5,499,480, which is a continuation-in-part of Ser. No. 82,989, Jun. 25, 1993, abandoned, which is a continuation-in-part of Ser. No. 40,494, Mar. 31, 1993, abandoned.

[51] Int. Cl.$^6$ ..................................... E04C 3/07
[52] U.S. Cl. .................. 52/653.1; 52/262; 52/271; 52/283; 52/655.1; 52/656.9; 52/731.9; 403/201; 403/280; 403/363
[58] Field of Search .............................. 52/481.1, 653.1, 52/262, 263, 271, 283, 731.9, 732.2, 733.3, 736.2, 737.6, 690, 655.1, 656.9; 403/201, 280, 363, 403

[56] References Cited

U.S. PATENT DOCUMENTS

| | | | |
|---|---|---|---|
| 1,258,147 | 3/1918 | Sargent | 403/363 X |
| 1,331,247 | 2/1920 | Daniels . | |
| 1,924,881 | 8/1933 | Ragsdale . | |
| 2,029,645 | 2/1936 | Waugh . | |
| 2,098,752 | 11/1937 | Miller . | |
| 2,167,835 | 8/1939 | Greulich . | |
| 2,457,250 | 12/1948 | Macomber . | |
| 2,611,160 | 9/1952 | Hanesse . | |
| 2,781,110 | 2/1957 | Weller et al. | 403/201 |
| 3,083,794 | 4/1963 | Stovall, Jr. | 52/731.9 X |
| 3,129,493 | 4/1964 | Grubb . | |
| 3,195,735 | 7/1965 | Jay | 403/201 X |
| 3,221,467 | 12/1965 | Henkels . | |
| 3,541,749 | 11/1970 | Troutner . | |
| 4,001,993 | 1/1977 | Daniels | 52/733.3 X |
| 4,069,638 | 1/1978 | Hasselqvist et al. . | |
| 4,168,596 | 9/1979 | Yoder, Jr. . | |
| 4,196,556 | 4/1980 | Russo . | |
| 4,253,224 | 3/1981 | Hickman et al. . | |
| 4,597,118 | 7/1986 | Mis . | |
| 4,854,096 | 8/1989 | Smolik | 52/731.9 X |
| 5,150,982 | 9/1992 | Gilb . | |
| 5,394,665 | 3/1995 | Johnson | 52/731.9 X |

FOREIGN PATENT DOCUMENTS

| | | |
|---|---|---|
| 675888 | 2/1930 | France . |
| 1382859 | 2/1964 | France . |
| 1472217 | 1/1966 | France . |
| 2063545 | 7/1971 | France . |
| 2269618 | 11/1975 | France . |
| 4023902 | 2/1992 | Germany . |
| 151212 | 12/1931 | Switzerland . |
| 2177132 | 1/1987 | United Kingdom . |
| 8809854 | 12/1988 | WIPO . |
| 8901549 | 2/1989 | WIPO . |
| 9117328 | 11/1991 | WIPO . |
| 9501486 | 1/1995 | WIPO . |

OTHER PUBLICATIONS

*The Carpenter's Steel Stud*—Product Brochure—HL Stud Corporation—Mar., 1994.

*Primary Examiner*—Christopher Kent
*Attorney, Agent, or Firm*—Brown, Martin, Haller & McClain

[57] ABSTRACT

The lightweight metal construction system begins with a beam formed from a single piece of cold formed sheet steel or other sheet metal which is bent lengthwise along four lines to form a triangular cross-section with two wings, side-by-side, extending from its apex. Various connectors which have lengths much shorter than the lengths of the beams are provided for attaching one beam to another. Connectors include gussets made of sheet metal or wood stud sections. The ends of the beams may be modified to form joints which are used to connect two beams together or to connect the beam to another construction material. Brackets formed from strips of sheet steel or other metal are bent to conform to outer surfaces of the beams or other construction materials are used to attach the beams to other beams or other construction materials. Fasteners or adhesive may be used to firmly attach the joints, connectors and/or brackets to the beams and construction materials.

12 Claims, 9 Drawing Sheets

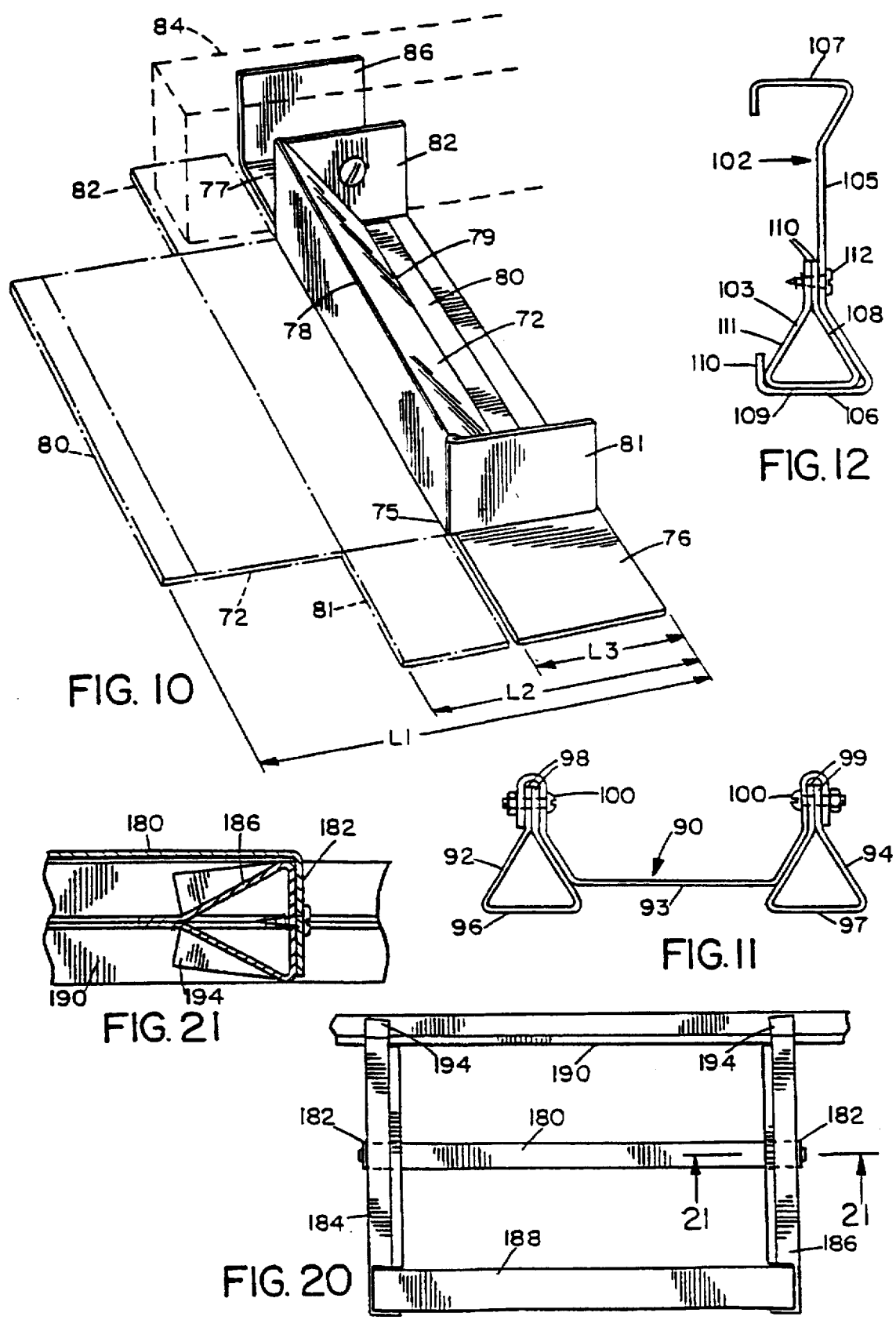

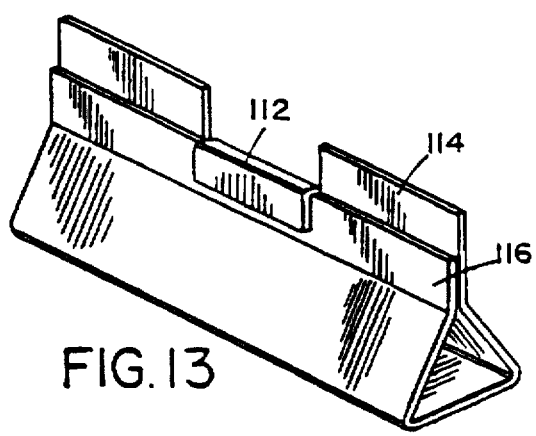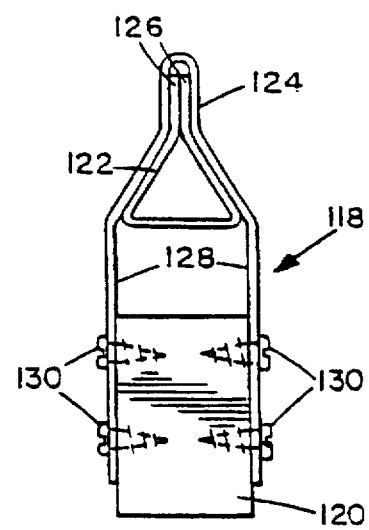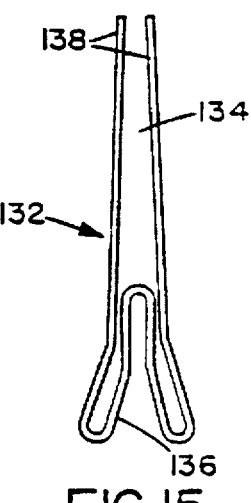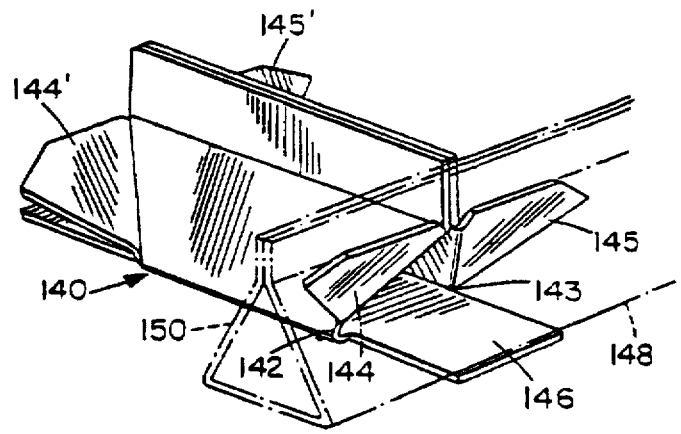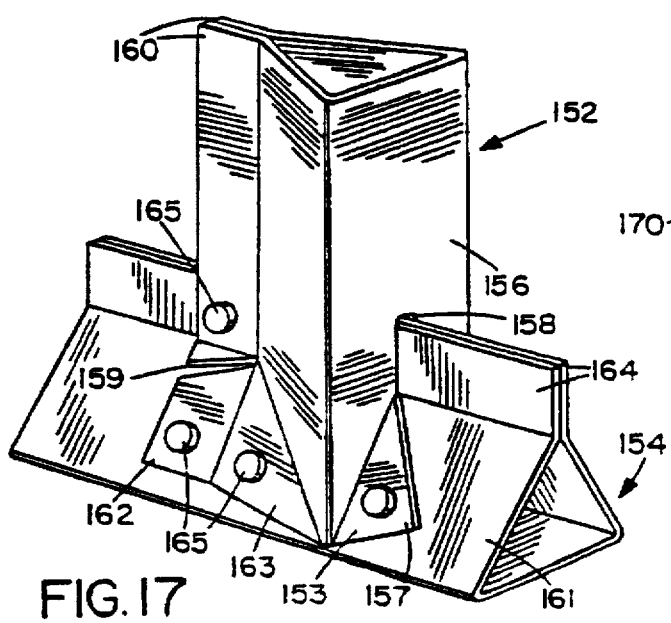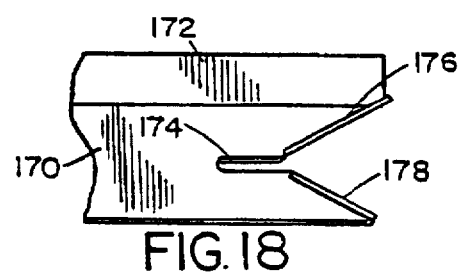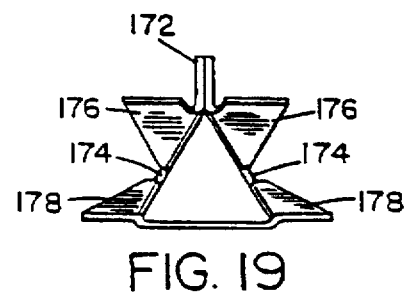

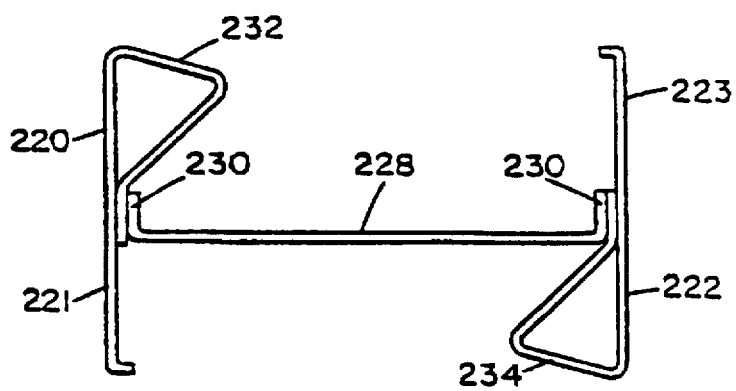
FIG. 25
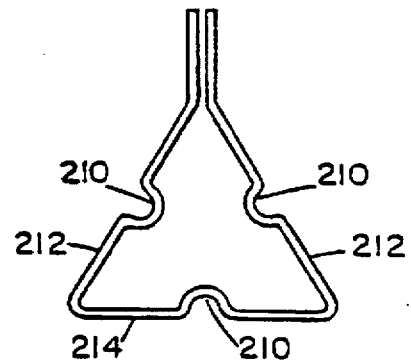
FIG. 24
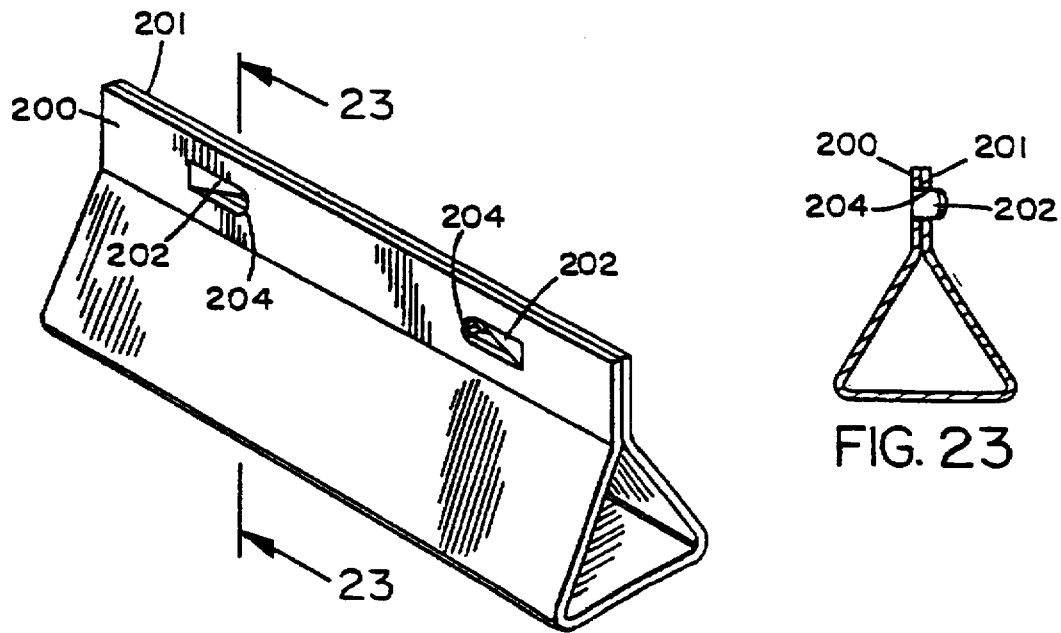
FIG. 22
FIG. 23

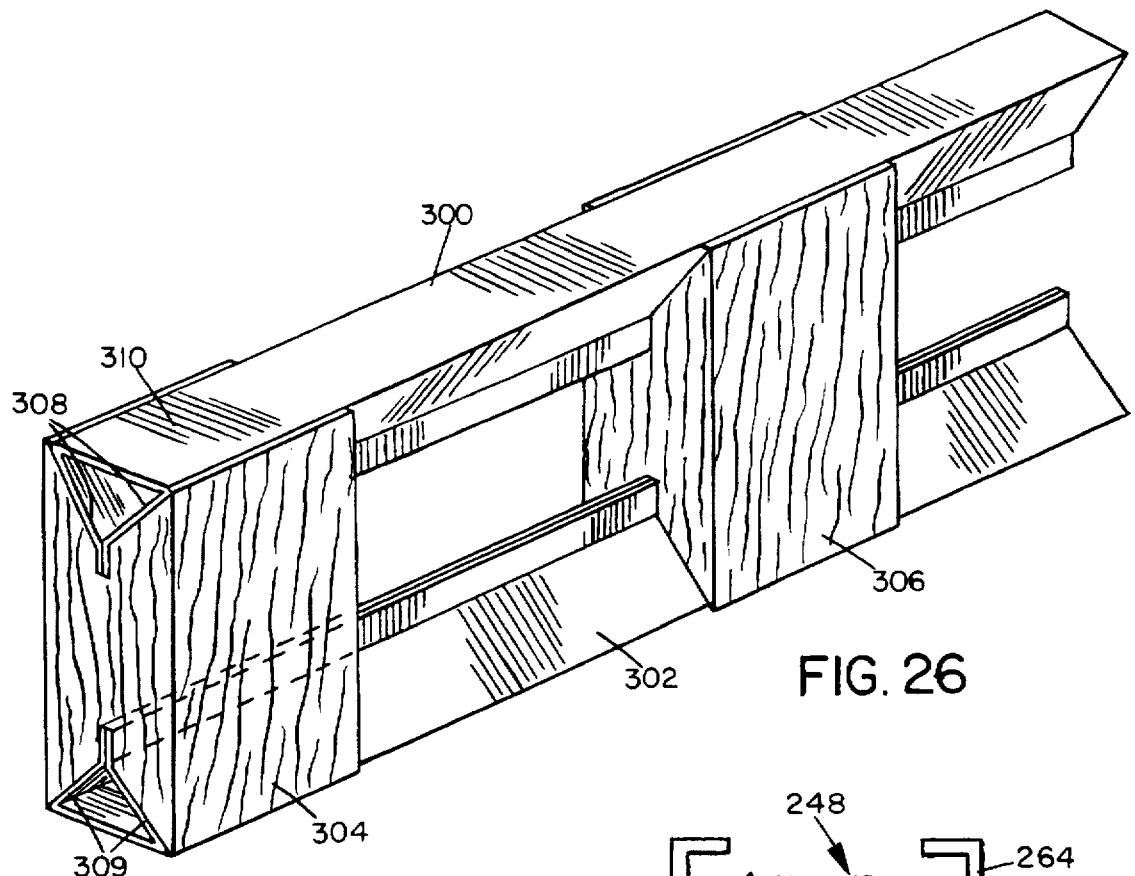
FIG. 26
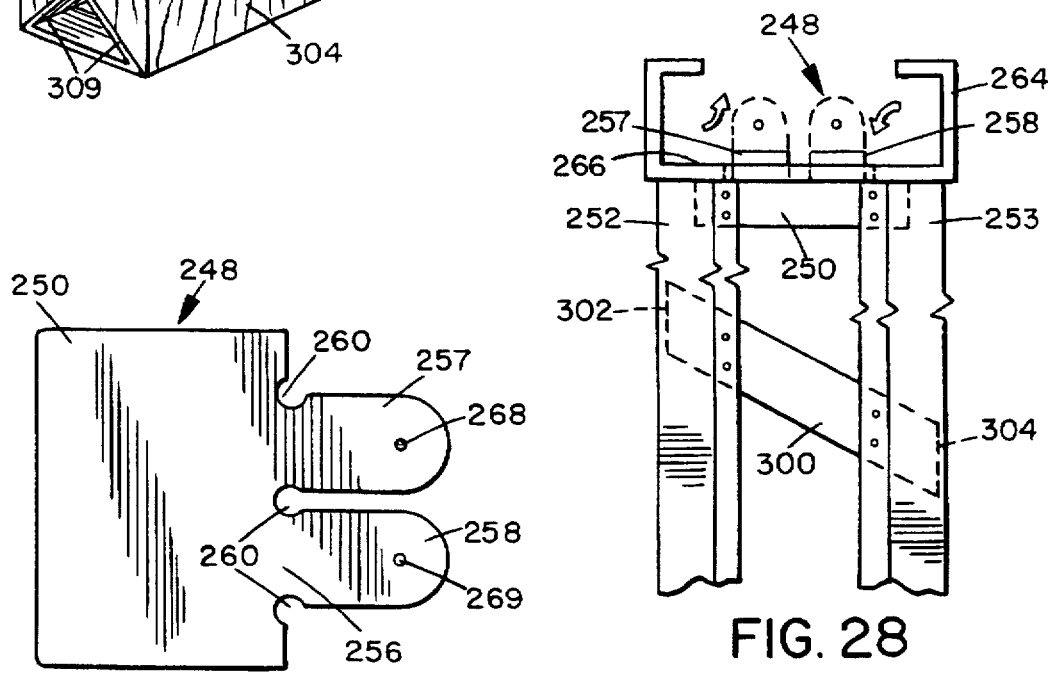
FIG. 27
FIG. 28

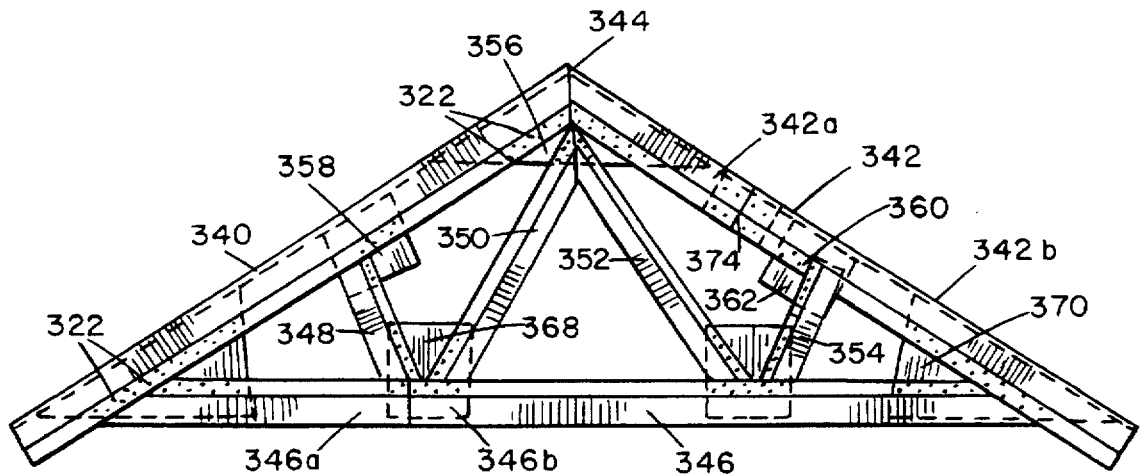
FIG. 29
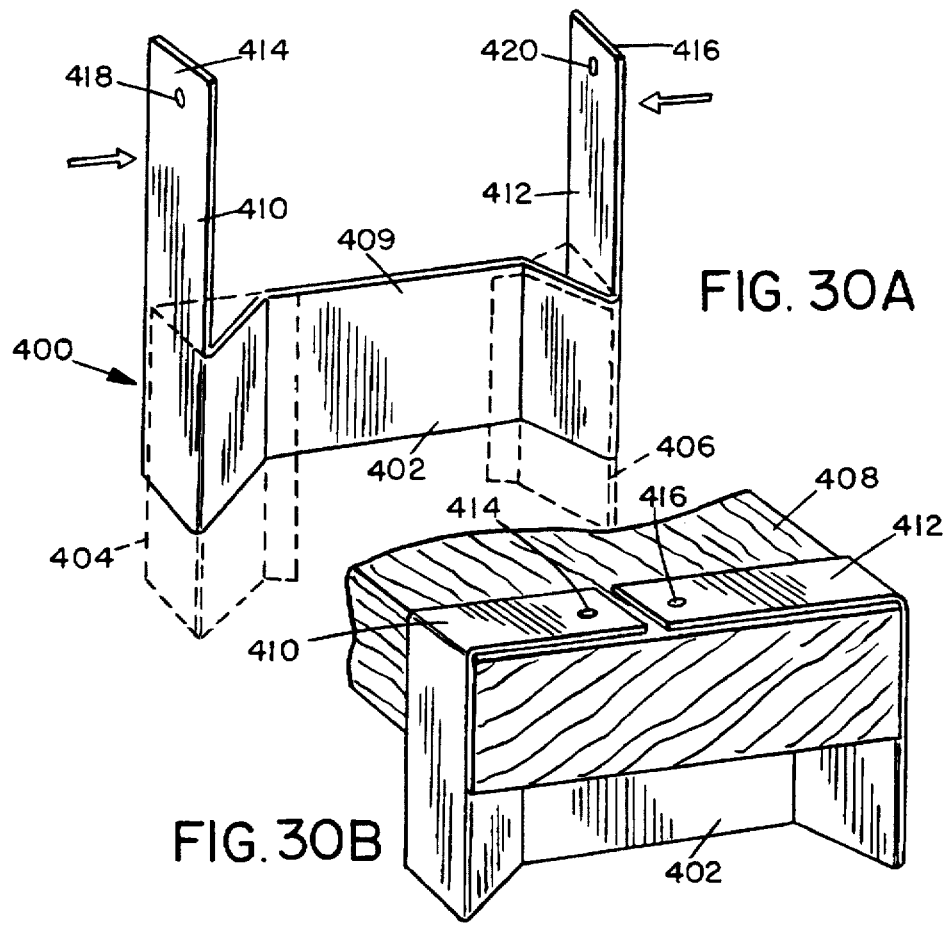
FIG. 30A
FIG. 30B

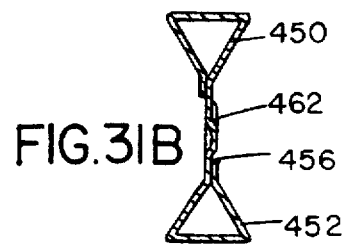
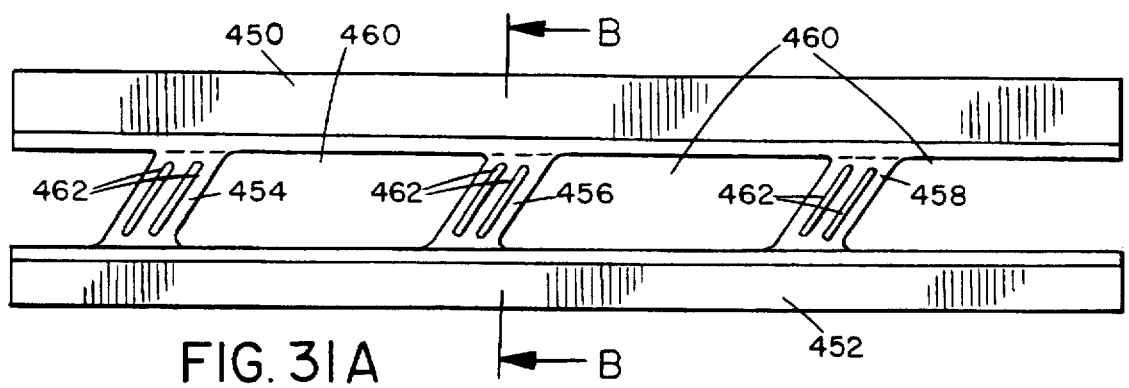
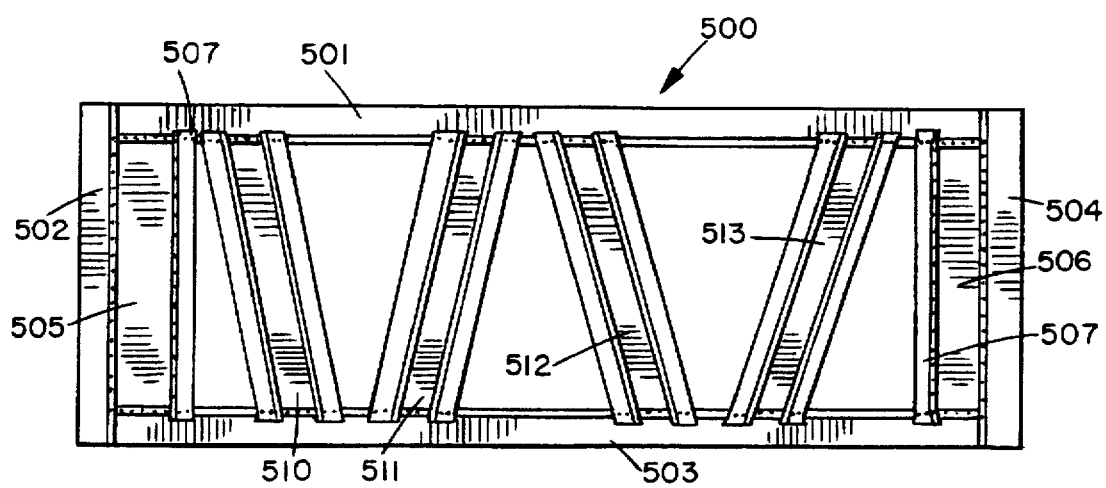

LUMBER-COMPATIBLE LIGHTWEIGHT METAL CONSTRUCTION SYSTEM

This is a Continuation-in-Part of application Ser. No. 08/190,643, filed Feb. 2, 1994, now U.S. Pat. No. 5,499,480, which is a Continuation-in-Part of application Ser. No. 08/082,989, filed Jun. 25, 1993, now abandoned, which is a Continuation-in-Part of application Ser. No. 08/040,494, filed Mar. 31, 1993, now abandoned.

BACKGROUND OF THE INVENTION

In recent years, the cost of lumber has increased dramatically as the result of limitations placed upon the harvesting of trees in order to preserve the environment. Within the last few years alone, the cost of lumber has more than doubled. This cost increase has had a major impact on the cost of new residential construction, making new homes more difficult to build and sell at affordable prices. This, in turn has resulted in the decrease in new housing starts and increased unemployment within the construction industry.

In addition to the increased expenses resulting from the high cost of lumber, there are other reasons that make it desirable to identify a viable alternative to wood for significant portions of the support structure in new construction. These reasons are related to the vulnerability of wood to insect damage and decay, and to the weight of the wood.

Pre-fabricated roof and floor trusses, and frame segments are well known in the residential and light commercial construction industries. The trusses are most commonly formed from two-by-four studs joined together by steel gussets, while the frame segments are often nailed together. The pre-fabricated roof trusses are lifted onto and attached to the top of a structural frame so that the roofing material can be placed on it. The prefabricated floor trusses are attached to the foundation or the lower portion of the structural frame so that plywood and flooring can be placed on top and attached thereto. The pre-fabricated components of a structure provide substantial time savings in the construction process, which can be critical when the climate in some areas permits only limited time windows suitable for construction. In general, the time savings result in cost savings. Nonetheless, the significant increase in the cost of lumber had made even these pre-fab trusses and frames so expensive that an alternative is being sought.

C-shaped or U-shaped lightweight steel beams or joists have long been used for framing in light commercial structures and other light construction. They also may have been used to a limited extent in residential construction where, for example, a hollow beam is desired. The shape of these beams is defined by a base wall that is perpendicular to two parallel side walls. Each side wall may also have an inward-extending lip parallel to the base wall and adjoining the edge of the side wall furthest from the base wall. The rectangular cross-sectional shape facilitates the use of such beams for framing structures in a manner similar to that in which conventional wooden framing members are used. The steel beams, however, are difficult to integrate with wooden framing members in a structure. The beams, unless they are relatively heavy gauge metal, can also be bent or crushed inadvertently during transport and while awaiting installation at a construction site. Moreover, they are less versatile than lumber, being difficult to configure into non-right angle joints.

Another disadvantage of C-joists is that they can only be roll formed perfectly straight, without any camber. Thus, no provision can be made for normal deflection which occurs in floors constructed thereon due to combinations of unsprung weight, applied live and dead loading, and limitations on the allowable depth of the floor. It is, therefore, necessary to compensate for this lack of designed-in camber by increasing the mass and thickness of the joist. This increases the cost of the beam material itself as well as increasing the load factors bearing upon the wall so that framing costs are also increased.

A lightweight steel beam has been developed by Navon which is described in PCT Application Publication Number WO 9117328, based upon U.S. patent application Ser. Nos. 07/518554 (filed May 3, 1990) and 07/674549 (filed Mar. 22, 1991). This structural beam is an I-beam of four piece construction, where the two bearing portions (top and bottom) have a "C"-shape and the web and flange portion consists of two pieces of sheet steel which are welded at their centers and bent outward to form the triangular flanges. This beam is illustrated in cross-section in FIG. 1, labeled "PRIOR ART". The flanges of the triangles are then welded to the insides of the "C"-shaped bearing portions to create the I-beam. Two beams are joined together by flat or angled gussets which are bolted or welded to the outer surface of the web.

While the Navon beam provides an improvement upon conventional steel beams since it is over 50% lighter and it is relatively easy to use in erecting a structure, it is not trivial to fabricate. Each beam consists of four pieces which must be bent and welded together over the entire length of the beam, making the production process one that requires several specialized pieces of machinery and consumes time. Further, the joints between two beams may be subject to excessive lateral stresses since the gussets merely attach to the outside of the web, without providing any reinforcement of the joint by the beams themselves.

A further disadvantage of the Navon beam and similar metal I-beam construction materials is that the metal is an excellent thermal conductor. In a structure which has the beam spanning the width of a wall, as the beams would normally be used, due to the continuous nature of the web, the temperature at the exterior surface of the wall is readily conducted to the interior along the entire length of the beam. No amount of insulation between the interior and exterior sheet material attached to the beam faces will eliminate this effect since the beam itself is the conductor. (The only effective insulation would have to be placed between the beam face and the sheet material.) Since the Navon beam is difficult to integrate with wood studs and other insulating framing materials, the high thermal conductivity cannot be cured by used of alternate materials within the structure.

SUMMARY OF THE INVENTION

It is an advantage of the present invention to provide a versatile lightweight steel beam system which may be used both in place of wood studs and in conjunction with wood studs in construction.

It is a further advantage of the present invention to provide a system for fabricating roof, floor and other types of trusses and frames in which the steel beams are easily fitted together in any of a number of different configurations and angles.

Another advantage of the present invention is to provide a versatile lightweight steel beam system as an alternative to both wood and traditional metal construction materials.

Yet another advantage of the present invention is to provide a metal construction system which has minimal thermal conduction between adjacent beams.

In an exemplary embodiment, the system for fabricating roof, floor and other types of trusses and frames begins with a beam or stud formed from a single piece of cold formed sheet steel which is bent lengthwise along four lines to form a triangular cross-section with two wings, side-by-side, extending from its apex. The two wings are not attached together by a separate fastening means, but remain separable until the stud is joined to another stud or other type of construction material. This feature means that the beam or stud itself can become part of the connection rather than just attaching a separate connector to an outer surface of the beam. This makes for much stronger joint as well as making assembly easier. For reinforcement of a long stud, notches may be made in the wings, allowing wing segments to be folded over. (Note that the terms "beam" and "stud" may be used interchangeably. This is intended only as an indication that the inventive structure can be used as either a stud (vertically-oriented frame component or a truss-member (horizontally-oriented frame component).)

A number of different means are provided to attach one stud to another at any angle. A combined gusset/tab connector has a first portion that can be inserted between the wings a first stud and a second portion consisting of a plurality of tabs which are inserted through a corresponding slot in the second stud or other material to which the first beam is to be attached. The tabs are then bent so that they are substantially perpendicular to the plane of the first portion of the connector and flush with the inner surface of the second stud. An important aspect of each connection means is that the joint formed between two beams or studs covers only a small fraction of the beam or studs total length so that thermal conduction between the two components is minimized.

Brackets may be used which are constructed in a similar manner as the beams, with triangular cross-sectional inserts or sleeves which fit within or over the stud, depending on the relative dimensions of the bracket's triangle and the stud's triangle. In one embodiment, the brackets have a single triangle with an extended wing providing a gusset which is inserted between the two wings of one of the studs to be attached, and fastened in place by screws, bolts, or other fastening means. The triangular portion of the bracket is inserted into the end of the second stud, or slid over the end, depending on whether the dimensions of the bracket triangle are less than or greater than those of the stud triangle. In another embodiment, the brackets have a triangle formed at two or more edges, to create a single wing extending between the triangles. The triangles are inserted into or slid over the ends of the studs to be joined, then fastened. To connect two studs end-to-end, a telescoping fitting consisting of a triangle with outer dimensions that are slightly smaller than the inner dimensions of the triangle of the stud is used by inserting the telescoping connector into the end of each of the two studs to be connected and driving fasteners through the studs and the telescoping connector. Similarly, a triangle of slightly larger dimensions can be used as a connector by sliding the connector over the ends of the studs to be joined.

The assembly procedure, i.e., piecing, sizing, cutting, is the same as that for a standard wood truss or frame, except that angle cuts on the ends of the beams are not required to assemble the steel truss according to the present invention. The cutting of angles at the ends of the studs is eliminated by using brackets with built-in angles. The studs and connectors can also be configured for use as wall studs for framing, door and window headers, and mobile home trusses.

Modifications to the basic stud can be used to create a number of different brackets for interconnecting multiple beams, to attach the beams to wood studs, or to provide means for suspending other beams, studs or sheets of building materials from a support structure constructed from the lightweight metal construction system. A sheer panel can be formed using beams to provide superior sheer strength as compared with similar panels constructed from wood or other metal construction materials.

One or more triangular studs can be partially embedded into sections of wood studs, such that the wood provides the connection between the two beams. The studs are firmly held within the wood by construction grade adhesive. By using a number of wood sections of equal length disposed at intermittent points along a stud perpendicular to the stud, two studs can be joined in a parallel relationship to create a composite stud which has the benefits of metal while still retaining wood surfaces to which other materials can be nailed.

The sheet steel of which the beams, studs and brackets are formed can be selected according to weight requirements for a particular structure, with most common construction applications using material ranging from 24 gauge to 8 gauge steel. Other materials, such as other metals (e.g., aluminum or titanium) or high strength plastics, may be used according to the purpose of the structure. Wallboard or plywood can be nailed or screwed to the base of the triangle, which is comparable in width to the edge of a two-by-four. Wood, plastic or other materials may also be inserted into the beam between the wings, to facilitate attachment of other construction materials. The wings of the beam and the various connectors can be pre-drilled so that the fastener need only be inserted through the appropriate holes to achieve the desired connection.

BRIEF DESCRIPTION OF THE DRAWINGS

Understanding of the present invention will be facilitated by consideration of the following detailed description of a preferred embodiment of the present invention, taken in conjunction with the accompanying drawings, in which like reference numerals refer to like parts and in which:

FIG. 10 is a perspective view of an alternative extension for attachment to a wood stud;

FIG. 11 is a side elevation of a bracket joining two beams side-by-side;

FIG. 12 is a side elevation of a bracket for joining two beams one over the other;

FIG. 13 is a perspective view of a beam modified to provide additional support;

FIG. 14 is a side elevation of a bracket for suspending a stud from a beam;

FIG. 15 is an end elevation of a bracket for supporting construction material above a beam;

FIG. 16 is a perspective view of a connector for joining two beams in a parallel arrangement;

FIG. 17 is a perspective view of a first joint for joining one beam to another in a perpendicular arrangement;

FIG. 18 is a side elevation of a second joint for joining one beam to another in a perpendicular arrangement;

FIG. 19 is an end view of the second joint;

FIG. 20 is a diagrammatic view of a frame section;

FIG. 21 is a cross-section taken along line 21—21 of FIG. 20;

FIG. 22 is a perspective view of a length of beam with an alternative reinforcement means;

FIG. 23 is a cross-section taken along line 23—23 of FIG. 22;

FIG. 24 is an end view of a reinforced beam;

FIG. 25 is an end view of an assembly for replacement of a wood stud;

FIG. 26 is a perspective view of a composite beam formed from two of the triangular beams and wood;

FIG. 27 is a top view of a gusset/tab connector;

FIG. 28 is a perspective view of the gusset/tab connector of FIG. 27 connecting two beams;

FIG. 29 is a roof truss constructed according to the present invention;

FIGS. 30a and b are an alternate connector for attaching a pair of triangular beams to a wood stud, with FIG. 30a showing the connector alone and 30b showing the connector with a wood stud;

FIGS. 31a and b illustrate a unitary wall stud constructed using the inventive construction system, with FIG. 31a showing a side elevation and FIG. 31b showing a cross-section taken along line B—B of FIG. 31a; and FIG. 32 is a shear panel constructed according to the inventive system.

DESCRIPTION OF THE PREFERRED EMBODIMENT

It should be noted that components of the inventive lightweight metal construction system are described as having tops, bottoms and sides for reference only. These designations are not intended to limit the construction system to use in such an orientation.

Figure 1:
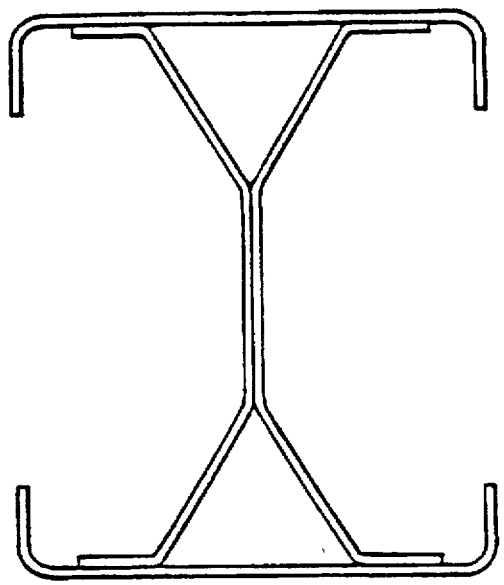
FIG. 1 is an end view of a lightweight steel beam of the prior art.
Figure 2:
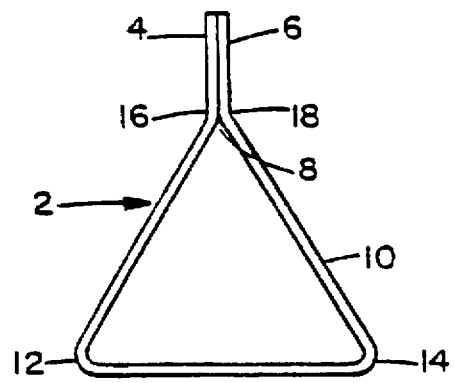
FIG. 2 is an end view of a lightweight steel beam according to the present invention.

As illustrated in FIG. 2, the basic lightweight steel beam or stud 2 is triangular in shape with a pair of wings 4 and 6 extending from the apex 8 of the triangle 10. The triangle 10 is created by bending a sheet of cold formed steel at four places: bottom corners 12 and 14 and shoulders 16 and 18 so that the edges of wings 4 and 6 are generally even. The triangle 10 is symmetrical around a line drawn from the apex 8 perpendicular to the base. The bottom corners 12 and 14 are slightly rounded to avoid weakening the metal at the bends. No welding or other fastening operation is performed on the stud 2, so the wings 4 and 6 remain unattached until a structure is assembled. The wings are essentially flanges that facilitate attachment of the beams to the various connectors described below and are not intended to act as webs as in a conventional I-beam. Therefore, typically, the wings need only be wide enough to support the fasteners driven therethrough and will be substantially shorter than the heights of the sides of the triangle. Holes may be pre-drilled in the beam to facilitate insertion of fasteners for connecting beams together.

The most basic connection means for attaching two studs together is a gusset consisting of a flat piece of sheet material which is inserted between the wings of each of the beams to be attached. The sheet material may be metal, ceramic, plastic, fiberglass, polymer, composite or any other durable, high shear strength material. For joining beams that provide exterior to interior framing, an insulating material such as ceramic, plastic, or glass-polymer composites, e.g., Micarta™, which is manufactured by Westinghouse Corp., may be desirable to provide a non-thermally conductive joint. A roof truss utilizing a number of different gussets is illustrated in FIG. 29. The upper beams 340 and 342 slope downward from peak 344, and are attached together near their lower ends by horizontal beam 346. To provide vertical support, four support beams 348, 350, 352 and 354 extend between upper beams 340 and 342 and horizontal beam 346. At each joint, one or more connectors is used.

At peak 344, a gusset 356 is used to connect beams 340, 342, 350 and 352. For additional stability gusset 356 is cut in a triangular shape. The upper edges of gusset 356 are inserted into the wings of beams 340 and 342, which are oriented with their bases pointing upward and wings pointing downward. Fasteners 322 are driven through the wings of each beam 340 and 342 and the upper portion of gusset 356. The base of gusset 356 is then inserted into the wings of beams 350 and 352 in which the upper ends have been cut at angles to allow the ends to be joined together. Fasteners 322 are driven through the wings and base of gusset 356 to attach the four beams together.

At joints 358 and 360, beams 348 and 354 attach to beams 340 and 342, respectively, at generally right angles. Since both joints are the same, only the joint between beams 342 and 354 will be described. Here, a square gusset 362 is used in conjunction with a bracket 364. (Two connectors are illustrated to provide an example of use of connectors in tandem and it is not intended to indicate that this particular joint requires the reinforcement provided by two connectors.) Bracket 364 is inserted into the end of beam 354 with its open end facing upward. Flanges 366 extend upward at an angle that generally matched the profile of beam 342. Gusset 362 is inserted into beam 354 and into the opening in bracket 364 so that a portion of gusset 362 extends upward. Fasteners 322 are driven through the sides and the wings of beam 354. Gusset 362 is inserted into beam 342 and fasteners are driven through the wings of beam 342. Flanges 366 of bracket 364 are positioned on the outside of beam 42 and fastened.

The lower ends of beams 348, 350, 352 and 354 are attached to horizontal beam 346 by square gussets. For illustration, the joint between beams 348, 350 and 346 will be described. Gusset 368 is inserted between the wings of beam 346 so that it extends upward. Fasteners are driven through the wings and the lower portion of gusset 368. The left side of gusset 368 is inserted into the interior of beam 348 and the right side is inserted into beam 350, with fasteners being driven through the wings of both beams and though the gusset.

The joint between the upper beams 340 and 342 and horizontal beam 346 is created by triangular gusset 370 which is inserted into the upper and lower beams with fasteners being driven through the wings of each of the beams to lock the gusset in place. In order to make the shallow angle, the upper edges of beam 346 are cut at a slant.

Beams 340 and 342 are of a length such that two separate beams may need to be pieced together. For illustration, beams 342a and 342b are joined by connector 374. It is possible also to double up the function of a connector in the joining of two beams end-to-end with other joints using a gusset to make the end-to-end connection as well as an angled connection such as at the intersection of beams 346, 348 and 350, where beams 346a and 346b are joined to make horizontal beam 346.

The shape of the gusset is generally dictated by the angle at which the beams are to be joined. As shown in FIG. 28, although the beams 252 and 253 are joined in parallel, rather than using a simple rectangle or square, the gusset 300 is shaped as a parallelogram so that it spans the space between the beams at an angle while the ends 302, 304 of gusset 300 still abut the inside surface of the bases of beams 252, 253. This angular configuration provides additional shear strength. For additional strength, ribs may be formed in the gusset parallel to the edges which span the space between the beams being connected. The connectors illustrated in FIGS. 31a and b show such ribs, which may be stamped or roll formed into the sheet metal.

A significant advantage of using gussets, i.e., small pieces of sheet metal inserted between the wings of the beams, for joining two beams together is that there is not continuous connection between the beams for the full length of the beams. The gussets are inserted only at corners, or, where the beams are parallel, only at intermittent points along the beam, similar to the composite beam of FIG. 28. The gusset is not intended to be a substitute for the web of an I-beam, it is merely a connector. The lack of continuous connection between two beams is important when considering insulation and thermal conduction in buildings constructed with metal or partly metal frames. Minimal thermal conduction occurs where there is minimal connection between two beams. The space between the beams is, itself, a good insulator. However, the availability of space allows the effective installation of insulation. Further, if the gusset is made of a non-thermally conductive material, conduction between the two beams is effectively eliminated.

One embodiment of the invention is a wall stud that can be substituted for a 2×4 wood stud to provide the inner and outer surfaces for mounting sheet material. This wall stud, illustrated in FIGS. 31a and b, is similar to the composite beams of FIGS. 26 and 28, having two triangular-cross-section studs 450 and 452 maintained parallel to each other by connectors 454, 456, 458 intermittently spanning the space between the two studs. The bases of the triangles, 451 and 453, provide the surfaces for attachment for the interior and exterior sheet material. In this embodiment, the entire wall stud is formed from a single piece of roll formed sheet metal. The space 460 between the connectors are created by stamping or cutting the sheet metal. The connectors 454, 456, 458 have ribs 462 formed therein to provide additional strength to the connection. This allows a standard-size wall stud, such as a 2×4, to be easily mass-manufactured while still retaining all of the thermal and high-strength qualities of the inventive construction system. Since no connectors are required to form the wall stud, the triangles remain open for easy attachment of the different connection means disclosed herein.

Figure 3:
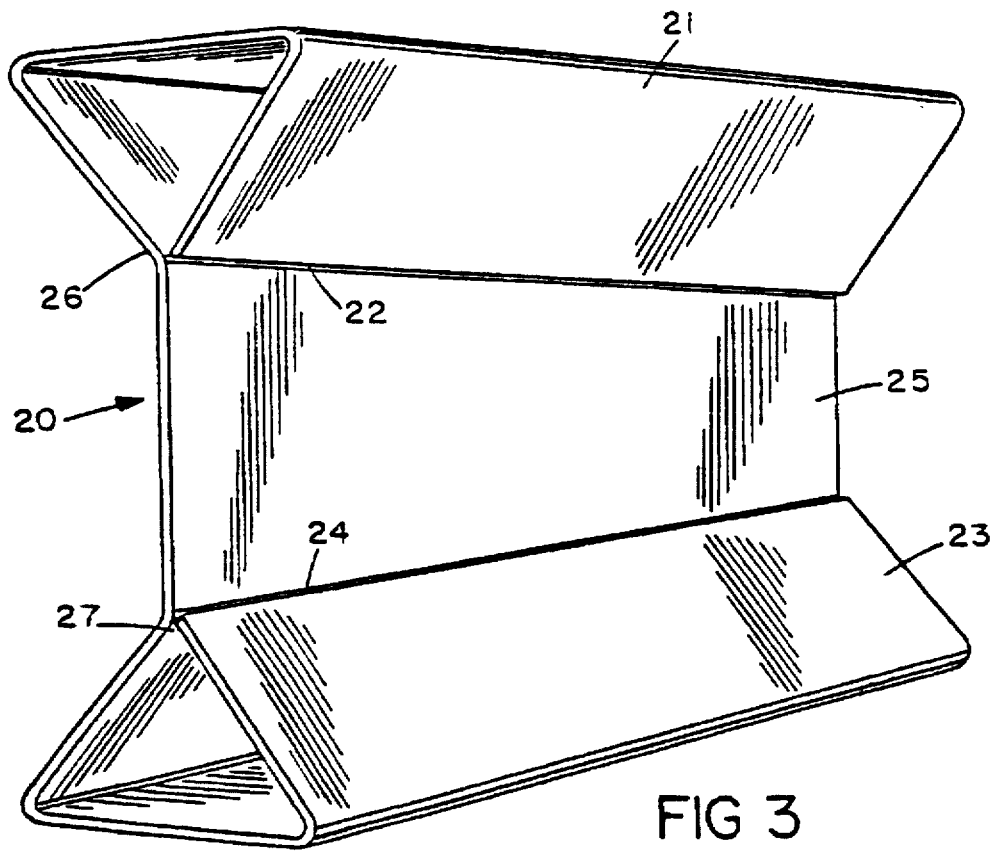
FIG. 3 is a perspective view of a first embodiment of the bracket.
Figure 4:
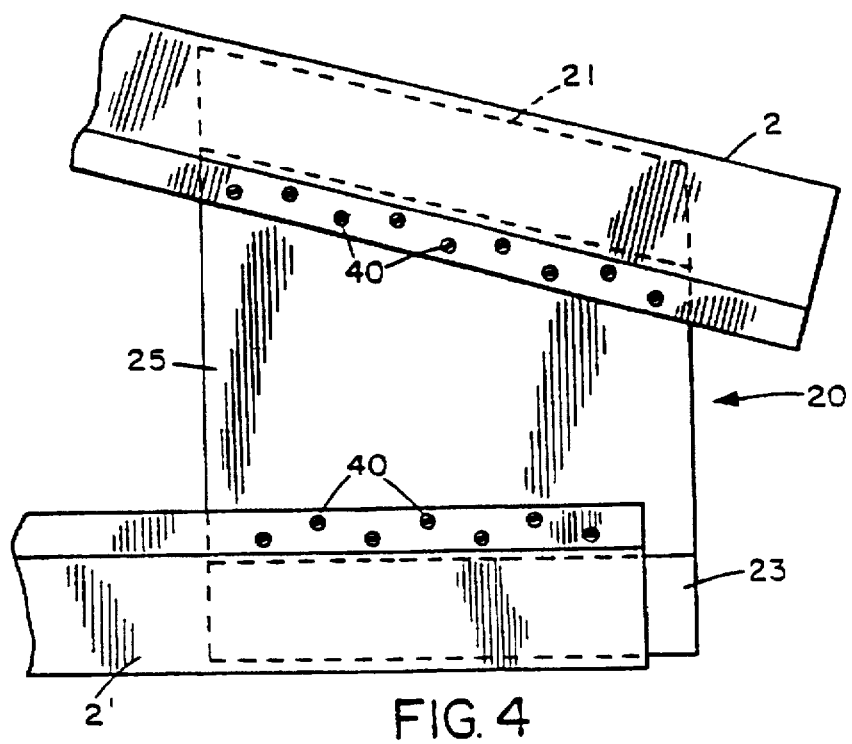
FIG. 4 is a side view of the bracket of FIG. 3 joining two beams.
Figure 5:
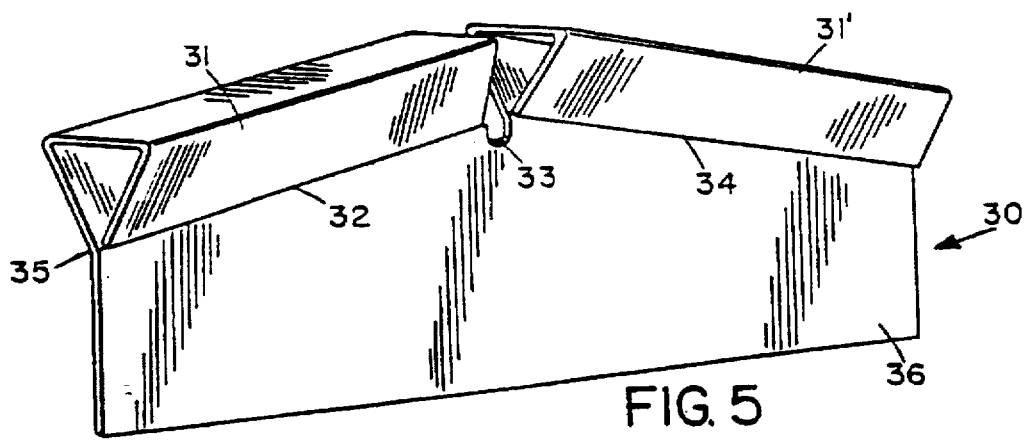
FIG. 5 is a perspective view of a second embodiment of the bracket.

One of the brackets for connecting two or more studs together are formed in a procedure similar to that used for the beams. As illustrated in FIGS. 3 and 5, the brackets 20 and 30 are formed by bending a sheet of cold formed steel to form a triangle at at least one edge of the sheet. Describing bracket 20, the edges 22 and 24 of bracket are bent inward so that they end at the apex 26 or 27 of the triangle without forming a second wing as in the studs. The sheet is pre-cut so that the edges have the desired angles. In this illustration, the sheet steel would be trapezoidal in shape. The dimensions of the bracket's triangles are preferably slightly smaller than those of the beam so that they closely fit within the beam's triangle. Alternatively, the bracket's triangles may be larger than those of the beam, with the beam being inserted into the bracket. A single wing 25 extends between the two triangles 21 and 23, unlike the two wings created in formation of the beams. This allows the brackets to be formed from a single sheet with the fewest number of bends possible, making their manufacture simple and economical. No fastening of the bracket itself is required, the only fasteners being applied when the beams and brackets are assembled. The assembly of a bracket 20 with two beams 2 and 2' is illustrated in FIG. 4. Fasteners 40 are shown as sheet metal screws, but may also be welds, rivets or bolts. The brackets may be pre-drilled with holes to facilitate assembly.

Figure 6:
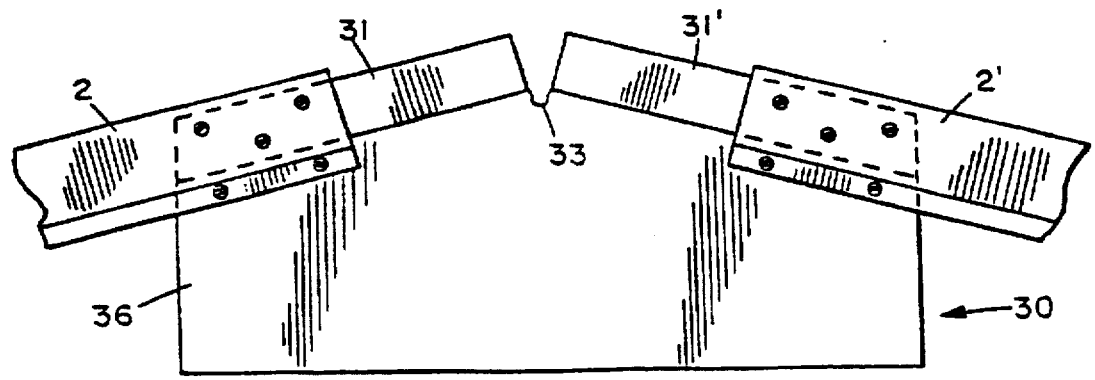
FIG. 6 is a side view of the bracket of FIG. 5 joining two beams.

Illustrated in FIG. 5 is a bracket 30 for forming the peak in a roof or similar angled construction by attaching two beams 2 and 2'. While the angle shown is relatively large, the bracket 30 can be formed to provide virtually any angle required. As described above for bracket 20, the sheet of cold formed steel is pre-cut to the desired angle, in this case forming a hexagon. A notch 33 is made at the apex 35 to allow the triangles to be formed independently of each other. The triangles 31 and 31' are formed by creating three folds parallel to the angle-cut edges 32 and 34, with the edges at the apex 35. The triangles 31 and 31' have sides slightly smaller than the inner dimensions of the triangle of a stud. Alternatively, the dimensions of the triangles 31 and 31' can be larger than the outer dimensions of the studs so that the bracket is fitted over the outside of the end of the beam to be joined. The bracket 30 and beams 2 and 2' are attached as shown in FIG. 6, with fasteners being driven through the wings of the respective beams and through single wing 36 of the bracket. Alternatively, as with other connections, the pieces may be welded together. Holes may be pre-drilled for the desired fasteners.

Figure 7:
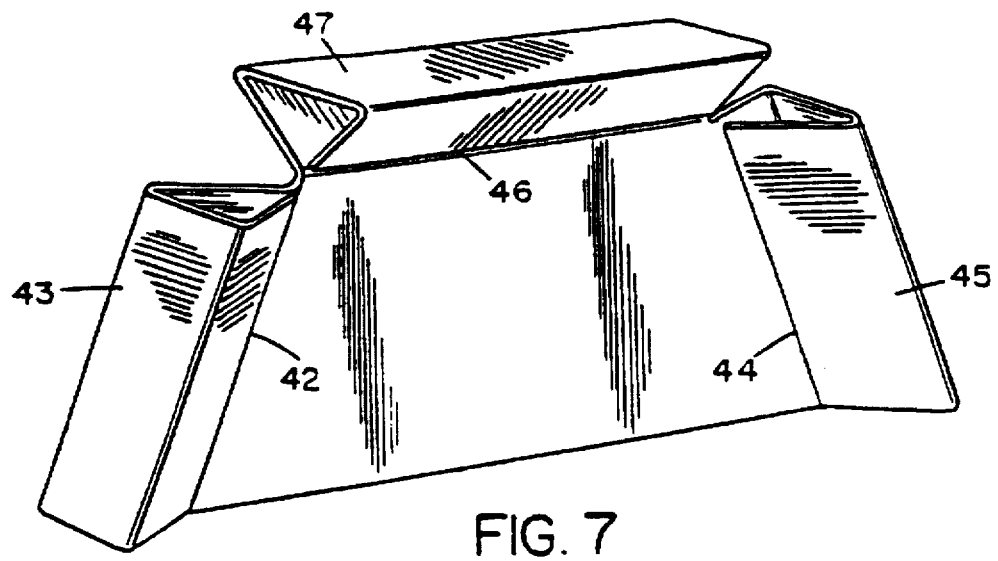
FIG. 7 is a perspective view of a bracket for joining three beams.

Three beams or studs may be joined together using a bracket of the configuration shown in FIG. 7. Edges 42 and 44 of the sheet metal are cut at the desired angles, then folded inward to form triangles 43 and 45. Edge 46 is also folded inward to form triangle 47. As with bracket 30, notches are cut between the individual triangles. The ends of the beams to be joined are slid over the appropriate triangle and fastened as above. The angles may be varied as needed by pre-cutting the sheet metal.

Figure 8:
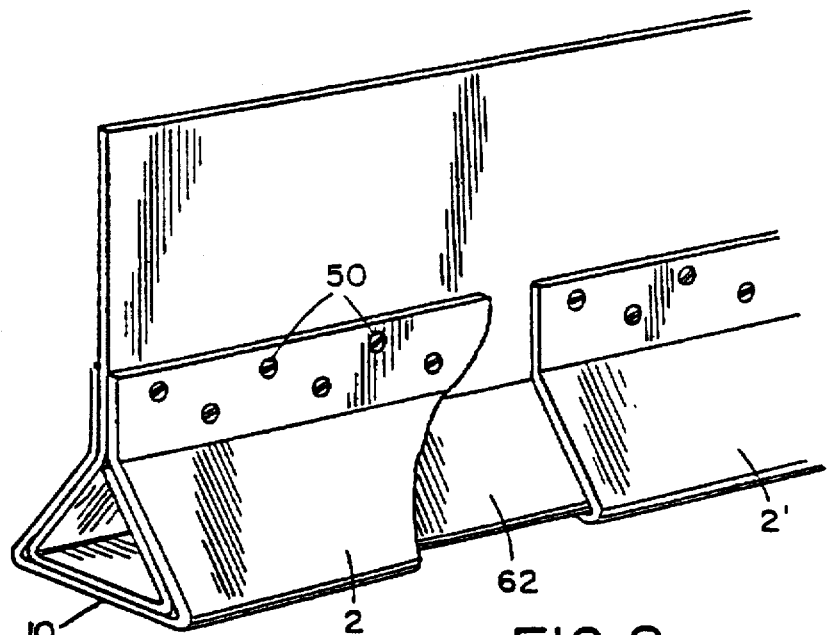
FIG. 8 is a perspective view, partially cut away, of a bracket joining two beams end-to-end.

Two studs may be attached together end-to-end by either inserting a telescoping-type connector bracket into the ends of each beam 2 and 2' or inserting the ends of the studs into the telescoping connector. A connection of the former type is shown in FIG. 8. The telescoping connector bracket 62 consists of a triangular tube formed by bending a single piece of sheet steel along three longitudinal lines into dimensions that are slightly smaller than the interior dimensions of the beam triangle 10. Alternatively, the dimensions of the triangular tube can be larger than the outer dimensions of the beam triangle 10 so that the bracket is fitted over the ends of the beams to be joined. The bracket 62 should fit closely within the triangle 10 to provide optimal support. Fasteners 50 or welds are then used to attach each beam 2 and 2' to the connector 62. As illustrated, the fasteners are driven through the respective wings of the connector and beams. Where the ends of the beams are inserted into the telescoping connector, the triangle of the connector has dimensions slightly larger than the outer dimensions of the beams.

Figure 9:
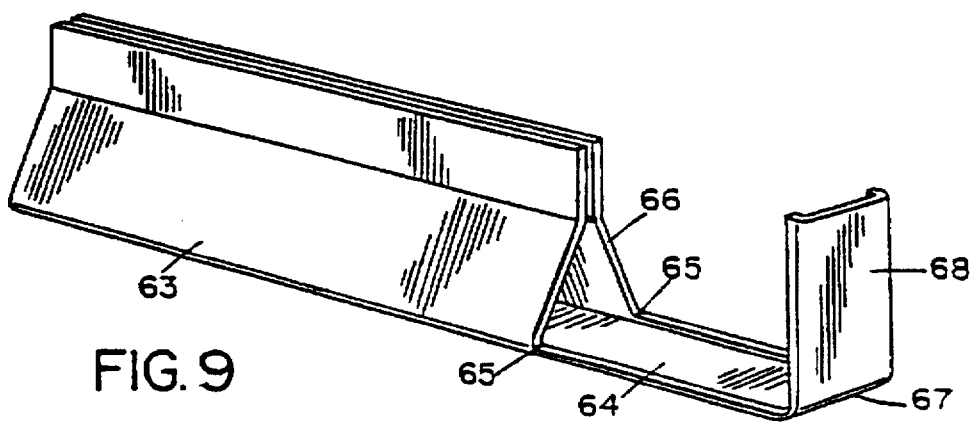
FIG. 9 is a perspective view of a beam section for attachment to a wood stud.

The connector or end joint illustrated in FIG. 9 provides a first means for directly attaching a beam to a wood stud (or other construction material). The triangular portion 63 can be either a beam itself, or a connector which telescopes with a beam, similar to the embodiment of FIG. 8. In either case, the triangular portion 63 is formed in the same manner as the beam of FIG. 2. Near the end of the beam, a section of the triangle is cut away by making a lengthwise cut along each of the lower corners 65 of the triangle, leaving only the base of the triangle. This creates an extension 64 which is generally flat (except for curvature at the edges 66 corresponding to the lower corners of the triangle). For a 2×4 stud, the end of extension 64 is bent upward to create a space of 2 inches between the location of the cut 66 and the upwardly bent end 68. The 2×4 stud is then fitted within the space, and fasteners such as nails or wood screws are used to attach the beam to the stud. The extension 64 provides additional support and stability for a composite structure made of beams and other construction material, such as, in this example, wood studs. The space may be adapted to fit any construction material by adjusting the location of the cut 66 and the bend 67.

An alternative embodiment of the end joint of FIG. 9 is illustrated in FIG. 10. This embodiment differs from that of FIG. 9 in that the triangular portion 72 is formed after the extensions are defined. A flat sheet of stainless steel is cut with two end sections 73 and 74 width L1 and a center of width L2 which equals L1 plus the outer width of the triangular portion 72 (shown unfolded by the dashed lines).

A lengthwise cut is made in from the ends along a line that will be the first corner 75 of the triangular section 72, leaving extension 76 and 77 with width L3. The metal sheet is then folded lengthwise to create corner 75. The center portion is folded lengthwise again to form corner 78 and bent at line 79 to form a lip 80. End tabs 81 and 82 are folded inward, against the ends of triangular section 72 to provide additional strength and to provide means for attachment to one side of a 2×4 stud or other construction materials. As an example, tab 82 is shown with wood screws through it for attachment to stud 84 (shown in dashed lines). Stud 84 fits within a space between tab 82 and extension end 86, which is bent upward to be parallel to tab 82. Fasteners may be driven through the outside of end 86 into stud 84. (As in other components, holes may be pre-drilled in the metal to facilitate assembly.) Extension 76 is shown without an upwardly bent end. In this configuration, attachment to a wood stud (not shown) can be accomplished by driving fasteners upwardly through extension 76 and outwardly through tab 81. By not bending up the end,. connection can be made to a large beam or other large dimension structure, e.g., the edge of a concrete block. The combination of tab 81 and extension 76 can also be bent to create a curved contact surface for attachment to pipes or other rounded surfaces. An end joint configured as that shown in FIG. 10 retains the advantages of high strength and simple manufacture of the triangular beam while providing versatility for adaptation to other building surfaces.

A second means for attaching a pair of triangular beams to a wood stud is illustrated in FIGS. 30a and b. This type of connector could be used to attach vertical beams to a 2×4 header, for example. A separate connector 400 has two sections—a first section 402 which is bent to create partial triangular profiles for fitting over a portions of the exterior of each of beams 404 and 406 (shown with dashed lines in FIG. 30a). Fasteners may be driven through the wings of the respective beams and through the first section 402. The wood stud 408 (shown in FIG. 30b) to which the beams are to be attached is butted against the inside end 409 of the first section 402, between arms 410, 412. The dimensions of the connector 400 are such that it closely fits the wood stud dimensions, e.g., 4 inches between the arms for a 2×4 stud. With the stud 408 in place, arms 410, 412 are bent to wrap around the stud, with ends 414, 416 contacting the side of the stud opposite that abutting the first section 402. Holes 418, 420 may be pre-drilled or pre-cut to facilitate attachment to the stud 408 by driving nails, screws, or other appropriate fasteners through the holes and into the wood.

The bracket 90, illustrated in FIG. 11, is formed from a strip of sheet steel and may be of any length for use in connecting two neighboring beams. At each end of bracket 90, the metal is bent laterally to conform to the outer shape and dimensions of the beams to be joined. Here, both beams 92 and 94 are oriented in the same direction, with bases 96 and 97 facing downward. The ends of bracket 90 are bent to conform with the sides of the beams 92 and 93 and then bent downward at the center to wrap around the wings 98 and 99 of the beams. Fasteners, here, machine screws 100, are driven through the bracket and wings of each beam. It is possible to join a string of beams by continuing the extension 93 of bracket 90 for whatever length is needed, bending the bracket to conform to the upper profiles of the beams for each beam to be joined. For example, if a third beam were to be attached between beams 92 and 94, three lateral bends would be made in the center of extension 90 to conform to the wings and sides of the third beam.

Bracket 102, illustrated in FIG. 12, is used to join two beams which have their wings 104 pointed toward each other so that the two beams are parallel (only one beam is shown). Similar to previous brackets, bracket 102 is formed by making lateral bends in a strip of sheet steel. Each of the ends 106 and 107 of bracket 102 wrap around the side 108 and base 109 of the beam 103, and may have a lip 110 extending partially up side 111, so that each end 106 and 107 will cradle the beam. The ends 106, 107 may be extended along the beam's length to provide a greater contact surface area. A fastener 112, here, a sheet metal screw, may be driven through the bracket 102 and wings 104 to secure their relative positions. The extension 105 between the two triangular sections may be whatever length is needed to span the two beams.

The gusset/tab connector 248 for joining a first beam perpendicular to a second beam or other construction material, such as a C-shaped beam or sheet material, is illustrated in FIG. 27. The gusset/tab connector 248 is a flat piece of sheet steel which is cut with two or more tabs extending from one side. The first portion 250 has flat edges and is inserted between the wings of vertical beams 252, 253 shown in FIG. 28. Gusset/tab connector 248 may be attached to the vertical beams 252, 253 by welding or by suitable fasteners. The second portion 256 has tabs 257 and 258 formed therein. The tabs may be formed by stamping or cutting the sheet metal. Notches 260 are provided to facilitate bending of the tabs.

Tabs 257, 258 are inserted through a slot 262 in a horizontal beam 264 so that first portion 250 is on a first or outer side of the horizontal beam and the tabs are on the second or inner side. (The horizontal beam 264 is illustrated as a C-beam) The tabs 257, 258 are bent in opposite directions, so that each is perpendicular to the first portion 250 and flush with the inner surface 266 of beam 264. Only one, or more than two tabs can also be used to create such a connection. Where there are multiple tabs, the adjacent tabs may be bent in opposite directions. The tabs may be welded to inner surface 266, or fasteners may be driven through pre-cut holes 268, 269.

In FIG. 13 a means of reinforcing a lengthy beam is illustrated. When a beam is several meters long without support or some connection at its center, forces on the ends of the beam may cause the beam to gape at the center. This gaping can be alleviated by cutting a section 112 in one wing 114 and folding to over the other wing 116, thereby providing means for holding the wings together without requiring additional fasteners. As illustrated in FIG. 13, wing 114 is longer than wing 116 to facilitate this reinforcement procedure. Alternatively, a notch can be made in wing 116 to allow section 112 to be folded over when wings 114 and 116 are the same length.

Another means for reinforcing a lengthy beam is illustrated in FIGS. 22 and 23. A generally U-shaped cut 204 is made through both wings 200 and 201 of the beam to form a tongue 202. The tongues 202 from each wing are pressed together through both cut-outs and bent back around the outer side of the wing, as shown in FIG. 23. Alternatively, the inner tongue (as illustrated, the tongue on the right wing) can be cut off and the remaining tongue bent across as shown. The shape of the cut-out is not limited to a U-shape, but can be any cut which creates a tongue-like protrusion in one wing which may be bent through the cut-out in the adjacent wing to hold the two wings together.

A third means for longitudinally reinforcing the beam is shown in FIG. 24. Here, grooves 210 are formed in the sides 212 and base 214 of the triangle to provide additional strength against bending or gaping. By pressing or bending the metal surfaces. For ease of manufacture, the grooves are formed before the triangle itself is created. This way, large sheets of corrugated metal can be formed, then cut as needed to make the triangular beams.

FIG. 14 illustrates a bracket 118 for suspending a wood stud 120, or other type construction material, including other beams, from a beam 122. Bracket 118 is a strip of sheet steel which is bent laterally five times to form a generally triangular cross-section at its upper portion, including an open slot 124 into which the wings 126 of beam 122 fit. The two extensions 128 of bracket 122 can be as long or as short as needed to permit proper spacing between the stud 120 and beam 122. Screws 130, or other fastening means are used to fix the stud 120 within the bracket 118. Stud 120 need not actually be suspended from beam 122, but can merely be supported at its upper end by the beam 122 and bracket 118.

The bracket 132 shown in FIG. 15 is used for attaching construction materials (not shown) within space 134 to a beam (not shown), the top of which fits within generally triangular section 136, similar to the relationship between the beam and connector shown in FIG. 14. Bracket 132 is formed in the same general manner as other brackets. Space 134 may be expanded to accept a wood stud or other materials, a fastener (not shown) may be driven through extensions 138 to affix the material to the connector 132, similar to that shown in FIG. 14.

The end joint 140 illustrated in FIG. 16 may be a separate connecting piece or may be a modified end of a full beam which allows one beam to be directly attached perpendicular to a second beam. Here, it is shown as a separate connecting piece. End joint 14 is of the same construction as is the basic beam (as in FIG. 2). Lengthwise cuts are made along the lower corners 142, 143 of the triangle and the wing portions above the triangle are removed. The side flaps 144, 145 are bent away from the extended base 146 at the same angle as the side of a beam. Here, beam 148, shown in dotted lines, illustrates the relationship between the bent-back side flaps and the side of the beam to which the end joint 140 attaches. Extended base 146 supports the bottom (base) of beam 148, while the side flaps 144 and 145 contact the side 150 of the beam 148. Fasteners (not shown) may be driven through the base 146 and the side flaps 144 and 145 into beam 148 to firmly attach the end joint 140 perpendicular to the side of the beam 148. At the opposite end of the end joint 140, no beam is shown, but the flaps 144' and 145' and base extension 146 are ready to be attached to another beam which will then be parallel to beam 148.

The end joint shown in FIG. 17 may be formed either in a separate connector or at the end of a beam. Here, the joint is shown formed at the end of beam 152 which is to be attached perpendicular to beam 154. To form the joint, a basic beam is cut with a lengthwise cut 158 into the center of the base 156 for a distance approximately equal to the height of beam 154. Adjacent the lower part of the cut, the corners 157 are bent away from the base 156 to create a triangular opening corresponding to the cross-section of beam 154, with flaps 153 abutting sides 161 of beam 154.

A second cut 159 is made laterally across both wings 160 and the lower corners 162 are bent outward to create a triangular opening corresponding to the cross-section of beam 154 with flaps 163 abutting sides 161 of beam 154. The beam 152 is fitted down over beam 154 making sure that the wings 164 are fully seated within cut 158. Fasteners 165 may be driven through the flaps 153 and 163 and into sides 161.

FIGS. 18 and 19 illustrate an alternate joint for attaching the end of one beam to the top of another. This joint differs from that of FIG. 17 in that the wings of the two beams do not meet. Instead, the wings of the beam to which the beam 170 is to be joined are inserted into slots 174. Slots 174 are formed by cutting lengthwise in from the beam end into sides 170 and bending the corners of the slots 174 back to create flaps 176 and 178. The flaps 176 and 178 are bent back to create a triangular opening with dimensions corresponding to the triangular cross-section of a basic beam, such as shown in FIG. 2. Once the joint is fitted over the beam to which beam 170 is to be attached, fasteners (not shown) may be driven through flaps 176 and 178 into the sides of the adjoining beam to provide a strong connection between the beams.

FIGS. 20 and 21 show a support brace 180 which may be used to add strength to a structure which has extended lengths of beams. Brace 180 is a strip of metal with L-shaped ends 182 which wrap around the beams 184 and 186 and are fastened to each of the beams, generally located about half between the ends of the beams. FIG. 20 illustrates a section of frame in which the inventive beams provide the vertically running portions (beams 184 and 186) attached to a 2×4 wood stud 188 at the base by the end joint 192, as in FIG. 9. At the tops of the beams is attached a third metal beam 190, which is attached using the end joint 194 as in FIG. 17.

In the preferred embodiments, the width of the base of triangle 10 of a beam is comparable to that of a two-by-four stud, so that anything that would have required support from the edge of a stud, such as wallboard, plywood or roofing material, will be similarly supported by the beam 2. Similarly, where specialized connectors are described above for use with wood studs, the inventive beams may be substituted for the stud. Nails or other fasteners may be driven through any side of the triangle 3 to attach material which is to be supported. Other building materials may also be inserted between the wings 4 and 6 and into a beam. For example, a two-by-four stud can be inserted by spreading the triangle to provide a wood surface for nails. Similarly, plastics or composite building materials may also be inserted into the beams. Where appropriate, different size beams can be used which are larger than or smaller than the dimensions of a typical 2×4.

The combination of beams illustrated in FIG. 25 is an alternative to a 2×4 wood stud (or other standard wood construction beam), possessing the features that will allow other construction materials to be directly attached. This "metal 2×4" is formed from two asymmetrically bent triangular beams 220 and 222 which have legs 221 and 223 extending from the apexes to form a flat surface 226 comparable to the 2 inch edges of a 2×4 wood stud into which fasteners may be driven to support other construction materials. The two beams 220 and 222 are joined together by a generally L-shaped connector 228 which is attached to the inside wing 230 of each beam by welding or some other fastening means (welds are shown but not labeled). For attachment of construction materials to the broader side of the beam, fasteners may be driven through the bases 232 and 234 of the two triangles. As an example of the use of this "metal 2×4", it may be used to replace the wood stud 84 illustrated in FIG. 10. Leg 221 of the "metal 2×4" would be attached by fasteners to extension 77, and screw can be driven through end tab 82 into base 232.

FIG. 26 illustrates a composite beam formed from two triangular beams 300, 302 which are joined together by sections of wood stud 304, 305 and 306. The wood is cut with a triangular indentation and a slot to fit closely over the sides 308, 309 and wings of the beams. When the beam is embedded into the wood section, the base 310 of the triangle then becomes the end face of the wood stud, since it is essentially flush with the end of the stud. A construction grade adhesive, such as that used for attaching wood flooring or wall panelling, is used to permanently attach the two pieces together.

The lengths of the wood stud sections 304, 306 can be selected to provide, for example, the standard spacing between wall studs in an interior wall. The wood stud sections can be spaced at regular intervals, or in any manner to facilitate the construction process, such as appropriate spacing for installation of a window or pass-through, or for placement of recessed cabinets. Using the composite beam, the advantages of the metal beam are obtained while still retaining a substantial amount of wood surface to which sheet material or other objects may be nailed. (For example, it would be more secure to hang a heavy picture on the wall of a structure with the inventive frame if there is a wood beam available for placing picture hangers.) A composite beam may also be used to form an exterior wall, with beam 300 against the exterior surface and beam 302 against the interior surface. The wood insulates the exterior beam from the interior beam so that there is no thermal conduction between the two.

FIG. 32 illustrates a shear panel 500 constructed using the beams, studs and connectors as disclosed above. Beams 501-504 form the outer frame of the panel. Gusset 505 is inserted between the wings of beams 501,502 and 503, and gusset 506 is inserted between the wings of beams 501,503 and 504. Brackets 507 and 508 are formed as in the embodiment of FIG. 17 with a length equal to that of beams 502 and 504 and slits cut in each end to fit over the wings of beams 501 and 503. The wings of each bracket are fitted over the exposed edge of corresponding gusset 505 or 506. Fasteners are driven through the ends of brackets 507 and 508 and through the wings of the beams and the corresponding gusset. The web of the shear panel is formed by combining brackets, formed as in the embodiment of FIG. 17 with slits at each end, and gussets, with two brackets per gusset so that the gusset is sandwiched between the wings of both brackets. The web sections 510-513 are disposed at angles less than 90 degrees to the beams 501,503 so that the web has a zig-zag configuration. The ends of the brackets of each web section are fastened to the wings of beams 501 and 503 using rivets, sheet metal screws or other appropriate fasteners. The dimensions of the beams and brackets can be different from each other. For example, the beams 501-504 can be made from 16 gauge steel with triangle dimensions of 2"×2"×2", while the brackets can be 18 gauge steel with dimensions of 1.5"×1.5"×1.5". The gussets can also be made from 18 gauge steel.

The material of which the beams and various brackets are made can be adapted to fit the demands of the construction project. Cold formed steel ranging from 24 gauge to 8 gauge can be used, as well as other metals such as aluminum, titanium and numerous steel alloys. For most common construction purposes, steel will likely be the material of choice.

The connectors and brackets described above permit the formation of virtually any angle required for building a structure without requiring angle cuts to be made in the ends of the beams. This is of particular importance where the training level of the construction personnel is such that angle cuts are a frequent source of errors.

The inventive beams, studs, brackets and assembly method can be substituted for traditional two-by-four framing studs, door and window headers, and any number of other applications for which wood framing is traditionally used, or the metal construction system can be integrated with wood frame components. The lightweight steel beam system is inexpensive to manufacture and is as easy to assemble and handle as traditional wood construction. The use of steel beams as an alternative to wood addresses an issue that has had significant impact on the construction industry, providing a high quality, environmentally safe material. Further, the steel beams are immune to many of the problems of wood construction, since insect damage and wood rot are not of concern. Finally, the use of the simple triangular beam with connectors located only at joints or support points along their lengths avoid a significant drawback of prior art metal I-beam construction materials and C-joists since thermal conduction between two connected beams is minimized or completely eliminated, depending on the type of connection.

It will be evident that there are additional embodiments which are not illustrated above but which are clearly within the scope and spirit of the present invention. The above description and drawings are therefore intended to be exemplary only and the scope of the invention is to be limited solely by the appended claims.

I claim:

1. A lightweight, lumber-compatible metal construction system comprising:

a plurality of beams, each beam comprising a single piece of sheet metal bent lengthwise along four parallel lines to form a triangular cross-section having a base and two sides and two wings, one wing corresponding to each side, said one wing extending from an apex of said triangular cross-section, each said wing having a height substantially less than a height of said side, each said beam having a first length, an inner beam surface and an outer beam surface;

a plurality of connectors for connecting at least one beam of said plurality of beams to a construction material at a non-zero angle with respect to each other, each connector comprising a single piece of sheet metal adapted to abut at least one of said inner beam surface and said outer beam surface of said at least one beam so that at least a first portion of said connector is parallel to said wings, said connector having a plurality of edges and having a second length much less than said first length so that a connection point between said at least one beam and said construction material has a connection length much less than said first length, said connector having at least one tab extending from at least one of said plurality of edges and said connector being disposed within said beam with said at least one tab extending beyond an end of said beam so that said end of said beam is abutable against a first side of the construction material and said at least one tab is bendable so that at least a portion of said at least one tab is flush with a second side of the construction material; and a plurality of fastening means for fastening said connector to said construction material.

2. A lightweight metal construction system as in claim 1 wherein said at least one tab is insertable through a corresponding slot in said construction material.

3. A lightweight metal construction system as in claim 1 wherein said first portion of said connector extends from said apex of said beam.

4. A lightweight metal construction system as in claim 1 wherein said connector has two tabs and said two tabs are bent in opposing directions.

5. A lightweight metal construction system as in claim 1 wherein said at least one tab has a hole therethrough for facilitating placement of a fastening means of said plurality of fastening means for fastening said at least one tab to said second side of said construction material.

6. A lightweight metal construction system as in claim 1 wherein said at least one tab extends beyond said end of said beam in a plane parallel to said wings of said at least one beam.

7. A lightweight metal construction system as in claim 1 wherein said at least one beam comprises two beams disposed with said apex of each of said two beams opposite each other wherein said first portion of said connector spans a spacing between said two beams and connects said two beams together.

8. A lightweight metal construction system comprising:

a plurality of beams, each beam comprising a single piece of sheet metal bent lengthwise along four parallel lines to form a triangular cross-section having a base and two sides and two wings, one wing corresponding to each side, said one wing extending from an apex of said triangular cross-section, each said wing having a height substantially less than a height of said side, each said beam having a beam length, an inner beam surface and an outer beam surface and being openable between said two wings;

a plurality of connectors for connecting two beams of said plurality of beams together and to a construction material, each connector having a first portion comprising a strip of sheet metal for connecting said two beams together when said two beams are disposed opposite each other with each said apex of said two beams facing together, said first portion being parallel to and abutting said wings of said two beams and a second portion comprising at least one tab extending from said first portion so that when said connector is attached to said two beams, said at least one tab extends beyond an end of each of said two beams ends so that when said ends of said two beams are abutted against a first side of said construction material, said at least one tab is bendable so that at least a portion of said at least one tab is flush with a second side of said construction material; and a plurality of fastening means for fastening said connectors to said construction material and to said plurality of beams;

wherein said plurality of beams and the construction material are attached together so that a space exists between said plurality of beams and the construction material except at a connection point.

9. A lightweight metal construction system as in claim 8 wherein said first portion of said connector is inserted between said two wings of each of said two beams and said at least one tab extends in a plane parallel to said two wings of said two beams.

10. A lightweight metal construction system as in claim 9 wherein said at least one tab is adapted for mating with a slot in the construction material, wherein said at least one tab is insertable through the slot on a first side of the construction material and is bendable so that said tabs are flush with a second side of said construction material.

11. A lightweight metal frame and truss system as in claim 9 wherein said connector has a plurality of tabs and said tabs are bent with adjacent tabs in opposing directions.

12. A lightweight metal frame and truss system as in claim 8 wherein said at least one tab has a hole therethrough for facilitating placement of a fastening means of said plurality.

* * * * *